(12) United States Patent
Holzwarth et al.

(10) Patent No.: US 7,965,440 B2
(45) Date of Patent: Jun. 21, 2011

(54) DEVICE FOR GENERATING OR RECEIVING TERAHERTZ RADIATION

(75) Inventors: Ronald Holzwarth, Munich (DE); Rafal Wilk, Martinsried (DE)

(73) Assignee: Menlo Systems GmbH, Martinsried (DE)

( * ) Notice: Subject to any disclaimer, the term of this patent is extended or adjusted under 35 U.S.C. 154(b) by 27 days.

(21) Appl. No.: 12/455,318

(22) Filed: May 29, 2009

(65) Prior Publication Data

US 2009/0296197 A1 Dec. 3, 2009

(30) Foreign Application Priority Data

May 30, 2008 (DE) .................... 10 2008 026 190

(51) Int. Cl.
*G02F 2/02* (2006.01)
*H01S 3/10* (2006.01)

(52) U.S. Cl. ............ 359/326; 359/328; 359/333; 372/6; 372/22

(58) Field of Classification Search ................ None
See application file for complete search history.

(56) References Cited

U.S. PATENT DOCUMENTS

| | | | |
|---|---|---|---|
| 5,420,595 A | 5/1995 | Zhang et al. | |
| 5,663,669 A | 9/1997 | Vanderschaaf | |
| 5,710,430 A | 1/1998 | Nuss | |
| 5,729,017 A | 3/1998 | Brener et al. | |
| 5,789,750 A | 8/1998 | Nuss | |
| 5,952,818 A | 9/1999 | Zhang et al. | |
| 6,014,249 A | 1/2000 | Fermann et al. | |
| 6,111,416 A | 8/2000 | Zhang et al. | |
| 6,816,647 B1 | 11/2004 | Rudd et al. | |
| 7,054,339 B1* | 5/2006 | Hu et al. | 372/12 |
| 2005/0100866 A1 | 5/2005 | Arnone et al. | |
| 2006/0153255 A1* | 7/2006 | Wada et al. | 372/32 |
| 2009/0052013 A1* | 2/2009 | Higuma et al. | 359/333 |
| 2009/0190933 A1* | 7/2009 | Fichter et al. | 398/159 |

FOREIGN PATENT DOCUMENTS

| | | |
|---|---|---|
| EP | 1 230 578 B1 | 8/2002 |
| JP | 2006024803 A | 1/2006 |
| WO | WO 2007/082371 A1 | 7/2007 |
| WO | WO 2007/143542 A2 | 12/2007 |

OTHER PUBLICATIONS

German Patent Office Search Report dated Nov. 27, 2008 (4 pages).
E.R. Brown, "Milliwatt THz Output Power from a Photoconductive Switch", In: IEEE, ISDRS International Semiconductor Device Research Symposium, College Park, MD, USA, 2 Seiten, Dec. 2007 (2 pages).
Auston, D.H., et al. "Picosecond photoconducting Hertzian dipoles", Applied Physics Letters 45, (1984) pp. 284-286.

(Continued)

*Primary Examiner* — Hemang Sanghavi
(74) *Attorney, Agent, or Firm* — Flynn, Thiel, Boutell & Tanis, P.C.

(57) ABSTRACT

A device for generating or receiving electromagnetic radiation in a frequency range from 10 GHz to 100 THz is provided. The device includes a housing and a wave guide fiber leading into the housing. The wave guide fiber is adapted for guiding pulsed laser light with a first central wavelength. Within the housing, a terahertz converter is provided for generating or receiving the electromagnetic radiation in the terahertz range. The device also includes a frequency converter for converting the light exiting from the wave guide fiber to a second central wavelength being arranged between the end of the wave guide fiber and the terahertz converter in such a way that the terahertz converter is impinged by the frequency converted light.

51 Claims, 8 Drawing Sheets

OTHER PUBLICATIONS van Exter, Martin, et al. "High-brightness terahertz beams characterized with an ultrafast detector", Applied Physics Letters 55, (1989) pp. 337-339.

Grischkowsky, D., et al., "Far-infrared time-domain spectroscopy with terahertz beams of dielectrics and semiconductors", J. Opt. Soc. Am. B/vol. 7, No. 10/Oct. 1990, pp. 2006-2015.

Castro-Camus, E., et al., "Polarisation-sensitive terahertz detection by multicontact photoconductive receivers", Applied Physics Letters 86, 254102 (2005), pp. 1-4.

Rutz, F., et al., "Terahertz birefringence of liquid crystal polymers", Applied Physics Letters 89, 221911, (2006).

* cited by examiner

DEVICE FOR GENERATING OR RECEIVING TERAHERTZ RADIATION

FIELD OF THE INVENTION

The present invention concerns a device for generating or receiving electromagnetic radiation in the terahertz range, i.e. in a frequency range from 10 GHz to 100 THz.

BACKGROUND OF THE INVENTION

In the electromagnetic spectrum, terahertz radiation is located between microwaves and the infrared or visible optical radiation, respectively. Although the application of terahertz radiation for the time domain spectroscopy, TDS, was already described in the article "far-infrared time-domain spectroscopy with terahertz beams of dielectrics and semiconductors" of D. Grischkowsky in J. Opt. Soc. Am. B/Vol. 7, No. 10/October 1990, terahertz waves were hardly used because the generation of terahertz radiation was technologically very sophisticated until recently. A breakthrough for the terahertz technology came with the insight that terahertz radiation could be generated by irradiating ultrashort laser pulses (i.e. laser pulses with a duration of less than 10 picoseconds) onto a suitable non-linear material or into a photoconductive semiconductor element, i.e. between both electrodes of a dipole antenna provided on the semiconductor material. The latter is described e.g. in U.S. Pat. No. 5,729, 017 A. Basics for the generation and application of terahertz radiation are described in the book "Terahertz sensing technology, volume 1: Electronic devices and advanced systems technology," D. L. Woolard et al., World Scientific Publishing Co. Pte. Ltd. 2003.

Meanwhile, the most important areas of application for terahertz radiation are imaging methods—as described in U.S. Pat. No. 5,710,430 A—and spectroscopy methods, as described e.g. in U.S. Pat. No. 5,789,750. The advantage of terahertz radiation in comparison to other electromagnetic radiation, e.g. x-ray radiation, is that the absorption spectra of several materials are highly modulated in the terahertz range, and have a very characteristic course. Further, terahertz waves penetrate most non-metallic objects such as paper, cardboard, plastics and some semiconductor materials with hardly any attenuation. For these reasons, terahertz radiation is particularly suited for non-destructive methods of testing, or for the detection of certain gases or moisture.

The broader the field of potential applications, the more interesting it is to be able to generate terahertz radiation with low maintenance requirements, at low cost and in spatially small units. A device developed in this way for generating or receiving electromagnetic radiation in the terahertz range is described in EP 1 230 578 B1. In this device, a coupling end of a wave guide is guided into a housing. A comparatively large relay optic focuses the ultrashort light pulses exiting from the wave guide fiber onto a terahertz converter. Like in the present invention, the terahertz converter may e.g. be a photoconductive element according to U.S. Pat. Nos. 5,729, 017, 5,420,595, 5,663,669, Applied Physics Letters 45, p. 284, 1984, Applied Physics Letters 55, p. 337, 1989, or an electro-optic or magneto-optic device according to U.S. Pat. Nos. 5,952,818 or 6,111,416.

If the converter is a photoconductive element, then an electrically conductive dipole antenna is present in or on a semiconductor material, both poles of which are arranged at a mutual distance of merely several micrometers. The ultrashort laser pulses are focused by the relay optics between the two electrodes, in order to instantaneously release free electrons. If a voltage is applied to both electrodes of the dipole antenna, this leads in compliance with the Maxwell equations to an instantaneous flow of current, and hence, to the emission of terahertz radiation. In this case, the dipole antenna is used as an emitter. If no voltage is applied, the free electrons generated at the dipole antenna may be used for the detection of incoming terahertz radiation. In this case, the antenna operates as a receiver for the terahertz radiation. EP 1 230 578 B1 suggest to provide a comparatively compact module by arranging the terahertz converter, the relay optics and the coupling end of the wave guide in a common housing. Although EP 1 230 578 B1 gives first hints towards an industrially applicable terahertz source, there is still a potential for improvement.

WO 2007/143542 A2 discloses the frequency doubling of femto-second pulses of an Erbium doped fiber laser, in order to generate terahertz radiation with the frequency doubled pulses.

US 2005/0100866 discloses a terahertz emitter, which may be introduced e.g. into the human body in the form of a probe.

U.S. Pat. No. 6,014,249 A is directed to the temperature dependency of the frequency doubling of ultrashort laser pulses. This document discloses a heating in order to control the temperature of a frequency doubling crystal and, thus, the wavelength of the emitted light.

WO 2007/082371 A1 describes the application of polarized radiation, including polarized terahertz radiation, for measuring the orientation of fibers in materials such as wood or paper.

However, conventional terahertz sources exhibit potential for improvement in several aspects, in particular, with respect to their manageability.

Hence, it is the object of the present invention to provide, with as simple means as possible, a device for generating or receiving terahertz radiation, which is further optimized with respect to a compact structure, a reliable, low maintenance operation, and with respect to its optical efficiency.

SUMMARY OF THE INVENTION

According to the invention, this object is solved by a device with the features of claim 1, and by a method with the features of claim 27. Further improvements of the invention are referred to in the dependent claims.

The present invention is directed to a device for the generation or reception of electromagnetic radiation in a frequency range from 10 GHz to 100 THz. Depending on the configuration of the terahertz converter comprised in this device, the device may be used e.g. in imaging or spectroscopy methods as a source or receiver of terahertz radiation. The terahertz converter is located in a housing, into which pulsed light with a first wavelength $\lambda 1$ is guided by means of a wave guide fiber. This wavelength $\lambda 1$ may, for example, be the central wavelength of ultrashort laser pulses.

The invention suggests to arrange a frequency converter between the end of the wave guide fiber and the terahertz converter in the housing, this frequency converter converting the frequency of the irradiated laser light to a second wavelength $\lambda 2$. Further, these optical elements are arranged within the housing such that the terahertz converter is irradiated by the frequency converted light with a wavelength $\lambda 2$. The frequency f and the wavelength $\lambda$ of the light obviously obey the equation: $f=c/\lambda$, with "c" representing the speed of light.

For a skilled person, the insertion of a frequency converter in front of the terahertz converter seems to contradict the purpose of EP 1 230 578 B1 to minimize the complexity of the terahertz source or the terahertz receiver, respectively. To their surprise, however, the inventors could show that the rather low increase in complexity may lead to a considerable increase of the optical efficiency of the terahertz source. This increase in efficiency may be based on the circumstance that the frequency converter allows the use of different wavelengths in the wave guide fiber and on the terahertz converter respectively, such that for each element the wavelength with the highest efficiency may be used.

The frequency converter may, for example, be a frequency shifter, which shifts the central wavelength to different wavelengths (e.g. by a Solution Raman shift), or it may be a frequency multiplier. Due to its high efficiency, however, the invention prefers to use a frequency doubler.

It is known already that the generation of terahertz radiation is particularly efficient at a photoconductive element (i.e. a photoconductive antenna) in GaAs at an optical wavelength of about 800 nm, and that the terahertz radiation may be generated under these circumstances with a particularly broad spectrum. A frequency doubler as a frequency converter according to the invention now allows to guide light with a first wavelength $\lambda 1$ of about 1,500 to 1,700 nm in the wave guide fiber, before converting this light in the frequency doubler to a second wavelength $\lambda 2$ of about 750 to 850 nm, which is particularly efficient for the generation of terahertz radiation. This offers the advantage of not only being able to generate ultrashort laser pulses with a wavelength in the range from 1,500 to 1,700 nm with very high efficiency, for example at a wavelength of about 1,560 nm with an Erbium doped fiber laser, but this light may also be guided in the wave guide fibers substantially without any dispersion. Alternatively, arbitrary other combinations of wavelengths $\lambda 1$ and $\lambda 2$ may be used. For example, the light source might be an ytterbium laser with a central wavelength of 1,050 nm, the light of which receives a new central wavelength of 525 nm by the frequency doubler.

The device becomes particularly robust and compact if the frequency converter or frequency doubler is a crystal.

Due to the very high conversion efficiency, barium beta borate crystals (BBO crystals) or periodically poled lithium niobate crystals (PPLN crystals) are particularly suited for the frequency doubling. In the latter case, the areas of different polarity advantageously have a thickness of about 18-20 micrometers.

Preferably, the complete frequency converter has a thickness in a direction parallel to the propagation direction of the light of merely 50 µm to 1 mm, preferably between 100 and 300 µm. At such a strength, the frequency converter still has sufficient stability and efficiency, in particular if the frequency converter is a crystal. At the same time, however, a widening of the beam is substantially avoided during the transit through the frequency converter.

Again in order to avoid a substantial widening of the beam, but at the same time in view of obtaining a very compact structure, it is advantageous if the frequency converter is located at a maximum distance of 2 cm from the terahertz converter and/or at a maximum distance of 2 cm from the end of the wave guide fiber.

If it is considered necessary to further counteract an expansion of the beam, focusing optics might be arranged between the end of the wave guide fiber and the frequency converter and/or between the frequency converter and the terahertz converter.

Preferably, the focusing optics is or comprises a gradient index lens. Such GRIN lenses focus the light not by a curved surface, but by their refractive index changing in a radial direction. Due to their geometry, they may be connected very well to wave guide fibers and/or frequency converting crystals. In an alternative embodiment, aspherical lenses might be used.

In a particularly advantageous variant of the invention, the frequency converter is located directly adjacent the terahertz converter. In this way, the device becomes very compact, and its complexity is reduced, since no further optical element such as a focusing lens is arranged between the frequency converter and the terahertz converter. If the beam is pre-focused, or if the frequency converter is sufficiently thin, the beam expansion during the transit through the frequency converter is so small that the light intensity and, hence, the efficiency of the terahertz duration in the terahertz converter are still very high.

Further, the device of the present invention may be made compact and less complex by arranging the frequency converter directly on the end of the wave guide fiber. Hence, in a particular application, the frequency converter occupies the complete space between the end of the wave guide fiber and the terahertz converter.

If the optical elements, including the end of the wave guide fiber, the frequency converter, the terahertz converter and potential focusing optics, are arranged at a mutual distance, the spaces between them might be bridged by spacer pieces, which are transparent for the respective wavelength $\lambda 1$ or $\lambda 2$, in order to thereby invariably fix the distances between the optical elements. This is particularly advantageous if the positioning of the optical elements is intended to define the position of the focus, e.g. within the frequency converter, in order to obtain a particularly efficient frequency conversion.

In an ideal case, all spaces between the optical elements might be bridged by such transparent-spacer pieces.

In a further, advantageous embodiment of the invention, the terahertz converter is rotatable relative to the housing around the optical axis of the light impinging on the terahertz converter. If the terahertz converter is a terahertz source or a terahertz receiver with a photoconductive element, the polarization direction of the emitted or received radiation, respectively, is dependent on the rotation position of the terahertz converter. A rotatable terahertz converter now allows to adjust and selectively change the polarization direction of the emitted or received terahertz radiation. Such a device opens a completely new field in the polarization spectroscopy with terahertz radiation.

Preferably, the end of the wave guide fiber is arranged in a ferrule. Such a ferrule (or a different mounting element) stabilizes the end of the wave guide fiber and facilitates its mounting and arrangement and assembly in the device of the present invention.

For assembling the device of the present invention, it is particularly beneficial if the ferrule, the frequency converter and the terahertz converter are commonly located in a sleeve to be accommodated in the housing, since they can then be commonly inserted into the housing as a module.

The sleeve may e.g. be a hollow cylinder.

It is preferable that the sleeve is rotatable around its longitudinal axis. By means of this rotation, the rotational position of the terahertz converter and, hence, its polarization direction may be varied and adjusted. At the same time, however, the propagation direction of the light within the sleeve is not changed, since the optical axis of the light ideally is identical with the longitudinal axis of the sleeve.

If a rotatable sleeve is provided, handling of the device according to the invention is facilitated by providing a display for indicating the rotational position of the sleeve, in particular for indicating the rotational position of the terahertz converter in relation to the housing. In this way, the operator of the device may very rapidly note the present polarization direction of the terahertz converter.

Polarization maintaining fibers are particularly suited for the wave guide fiber. Such a fiber allows to guide polarized light to the frequency converter, which increases the efficiency during the frequency conversion.

The device of the present invention offers further advantages if the wave guide fiber is a zero dispersion fiber, or if the wave guide fiber consists of at least two sections having a different sign (+/−) of the (group velocity) dispersion, thereby compensating dispersion in total. In this way, dispersion compensated and hence, particularly short pulses may be guided to the frequency converter, which again increases the efficiency of the frequency conversion.

Various objects and advantages of this invention will become apparent to those skilled in the art from the following detailed description of the preferred embodiment, when read in light of the accompanying drawings.

BRIEF DESCRIPTION OF THE DRAWINGS

Like components are provided in the drawings consistently with the same reference numerals.

DETAILED DESCRIPTION OF THE PREFERRED EMBODIMENT(S)

Figure 1:
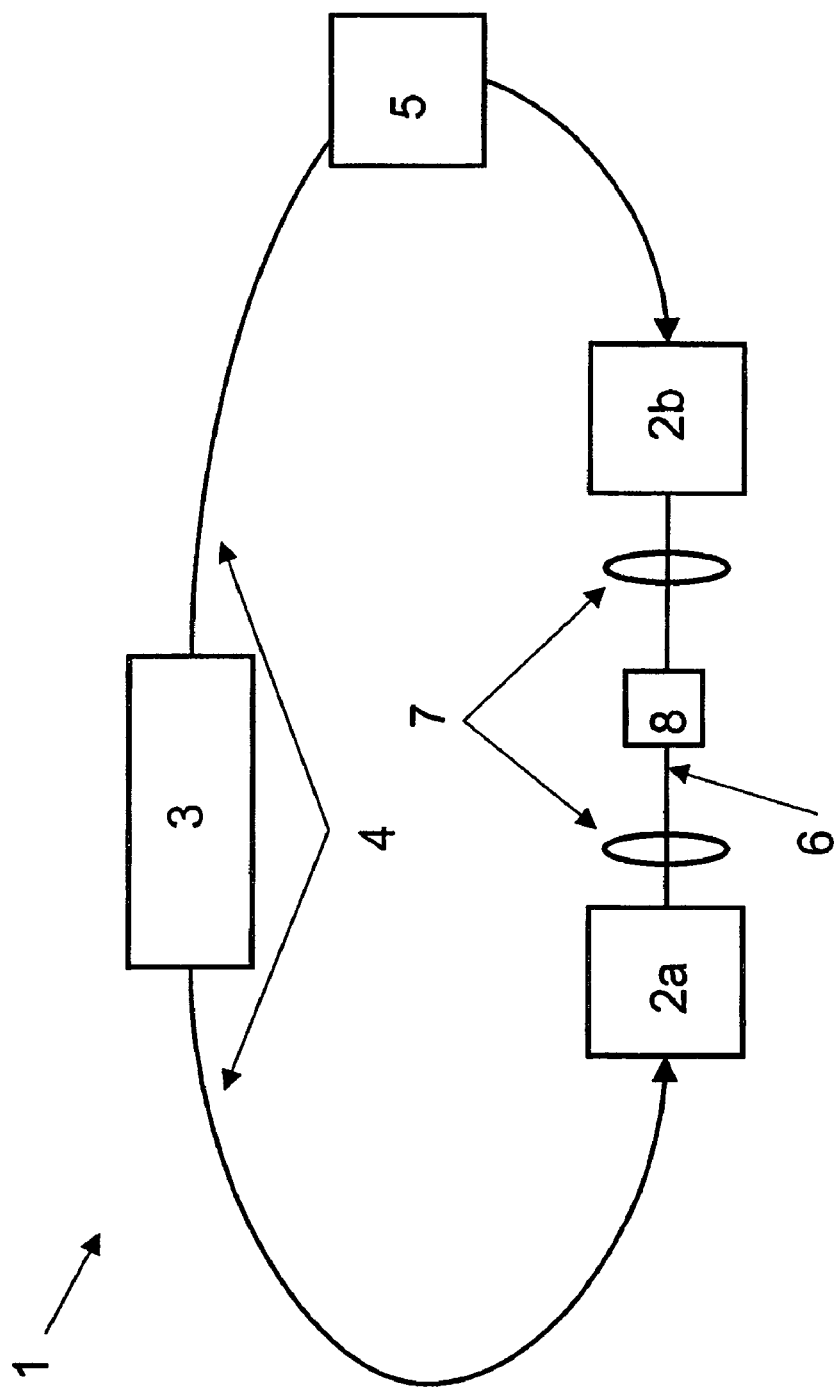
FIG. 1 is a schematic representation of a system for terahertz spectroscopy.

FIG. 1 shows in a schematic representation a system 1 for terahertz spectroscopy, which uses a device 2 according to the present invention for generating or receiving electromagnetic radiation in the terahertz range, i.e. in the frequency range from 10 GHz to 100 THz. A conventional system with the same layout, but without the device 2 according to the present invention, is described e.g. in U.S. Pat. No. 5,789,750 A.

The system 1 comprises an ultrashort pulse laser 3, for example a femto second laser. The ultrashort pulse laser 3 generates laser pulses with a duration of less than 10 picoseconds and with a central wavelength of $\lambda 1$. The ultrashort pulse laser may e.g. be an Erbium doped fiber laser with a central wavelength $\lambda 1$ of about 1,560 nm, or an ytterbium laser with a central wavelength $\lambda 1$ of about 1,050 nm.

A beam splitter (not shown) splits the beam of light generated by the ultrashort pulse laser 3 into two parts. Each of the partial beams is coupled into a wave guide fiber 4. The wave guide fiber 4 is optimized for guiding the light of the central wavelength of $\lambda 1$. In particular, the wave guide fiber 4 is designed such that its group velocity dispersion (GVD) over its entire length is as close as possible at zero, i.e. dispersion is compensated to the best possible degree. For this purpose, the wave guide fiber 4 may be a so-called "zero dispersion fiber." However, as such fibers may have undesired, nonlinear side effects, the wave guide fiber 4 preferably consists of two or more sections, in which the group velocity dispersion has a different sign, respectively. The lengths of these sections are adapted in such a way that the complete group velocity dispersion is as close as possible to zero. Further, the wave guide fiber 4 preferably is a polarization maintaining fiber. Alternatively, polarization control elements may be used on the wave guide fiber 4.

The system 1 for terahertz spectroscopy comprises two devices 2 according to the invention. One of the two wave guide fibers 4 is directly guided into one of the devices 2a. In the device 2a, an incoming ultrashort laser pulse leads to the generation of a pulse in the terahertz frequency range. Hence, in the spectroscopy system 1, the device 2a operates as an emitter of terahertz radiation.

The second wave guide fiber 4 exiting from the ultrashort pulse laser 3 is identical to the first wave guide 4 with respect to its optical properties, in particular with respect to dispersion and polarization maintaining properties. In contrast to the first fiber, the second wave guide fiber 4 leads to a second device 2b according to the invention via an optical delay line 5. When a laser pulse arrives via the wave guide fiber 4, the device 2b generates a measurement signal in dependency on simultaneously incoming terahertz radiation. Within the spectroscopy system 1, the device 2b, therefore, operates as a terahertz receiver or as a detector head, respectively.

The terahertz radiation generated by the first device 2a passes through a terahertz probe line 6 before arriving at the second device 2b. A first terahertz optics 7, for example an off-axis parabolic mirror or a pair of such parabolic mirrors, collimates the terahertz radiation onto a sample 8. Behind the sample 8 "x-rayed" by the terahertz radiation, the terahertz radiation passes another terahertz optics 7, for example, off-axis parabolic mirrors, which collimate the radiation towards the second device 2b. In a more simple embodiment, the terahertz optics 7 is merely a plastic lens, for example from PE, PP, or Zeonex.

Some components are not shown in FIG. 1, for example control and analysis means for the system 1.

Figure 2:
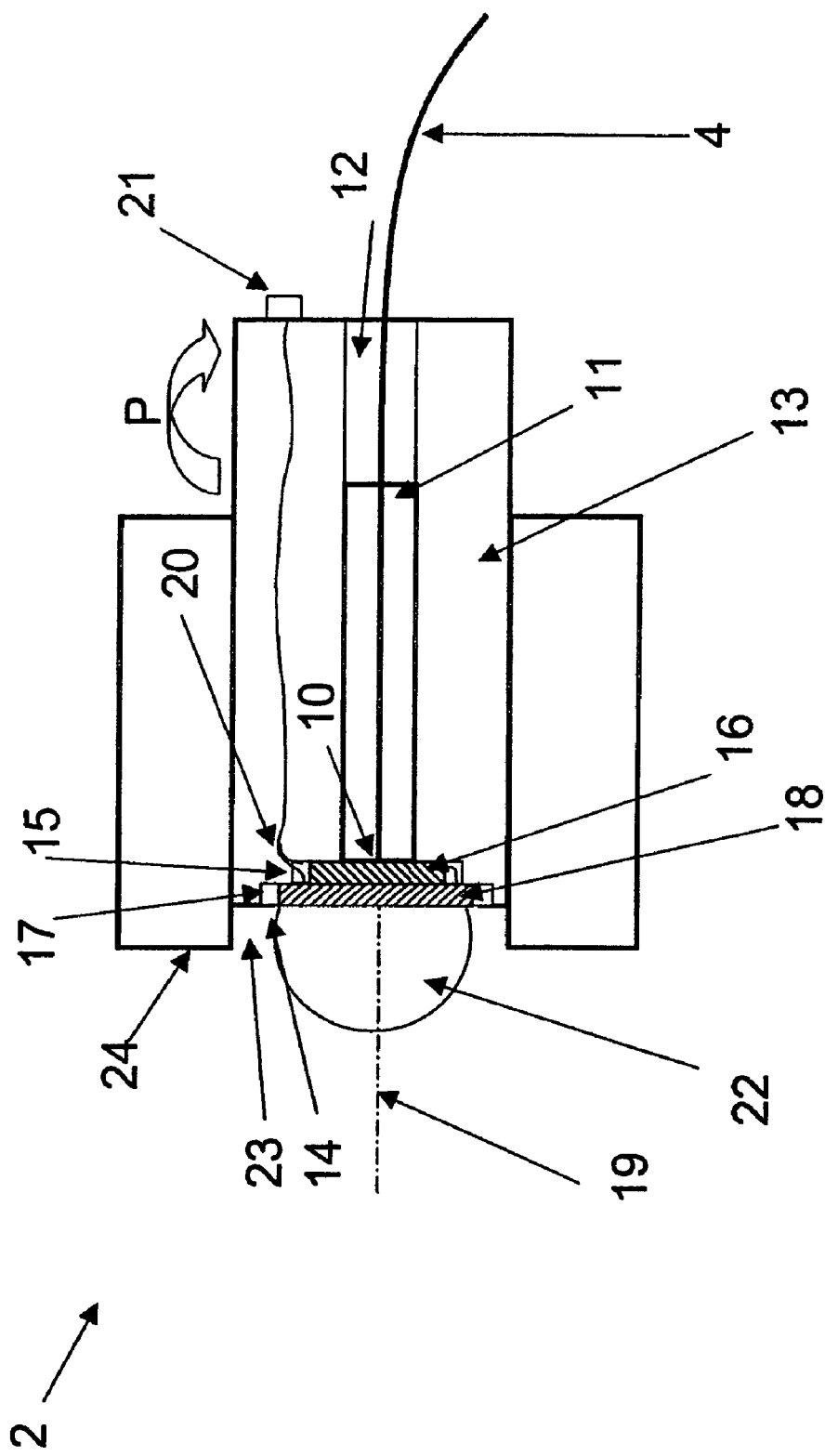
FIG. 2 is a horizontal section through a first embodiment of the device according to the present invention for generating or receiving terahertz radiation.

FIG. 2 shows a section through a first embodiment of a device 2 according to the present invention for generating or receiving terahertz radiation. Adjacent an end 10 of the wave guide fiber 4, a section of the wave guide fiber 4 with a length of several centimeters is embedded into a ferrule 11, for example a glass ferrule. The wave guide fiber 4 is located on the central axis of the cylindrical ferrule 11. The end 10 of the wave guide fiber 4 is flush with the circular front surface of the ferrule 11.

The ferrule 11 is located in a cylindrical bore 12 within a sleeve 13. The sleeve 13 may, for example, be made from a plastic material. The sleeve 13 also has a cylindrical circumferential surface. The bore 12 is arranged on a central axis of the sleeve 13, such that the wave guide fiber 4 is guided on the central axis of the sleeve 13.

On the left outer surface of the sleeve 13 in FIG. 2, there is a stepped recession 14. A frequency converter 16 is located in the deeper area 15 of the recession 14. The frequency converter 16 serves to convert the laser light of central wavelength $\lambda 1$ via the wave guide fiber 4 with the maximum efficiency to light with a central wavelength of a different central wavelength $\lambda 2$, at which a terahertz converter 16 located in the front area 17 of the recession 14 is particularly efficient.

In the present embodiment, the frequency converter 16 may be a nonlinear crystal for frequency doubling. Hence, the second wavelength $\lambda 2$ is half of the first wavelength $\lambda 1$. The frequency doubler 16 may be attached to the bottom of the recession 14 by means of an adhesive.

The terahertz converter 18 may, in principle, be any suitable means for converting optical radiation into terahertz radiation or vice versa, for example, a dipole antenna in a GaAs semiconductor, as known from the prior art. An electrical conductor 20 is guided through the sleeve 13 and contacts the terahertz converter 18. On the side of the sleeve 13 opposite the terahertz converter 18, there is an electrical conductor 21, by means of which either a voltage may be supplied to the terahertz converter 18, or an electrical current may be obtained from the terahertz converter.

In dependency on these two configurations, the device 2 according to the invention may be used as a terahertz emitter 2a, or as a terahertz receiver or detector head 2b, respectively.

In front of the terahertz converter 18, a hyperhemispherical lens 22 e.g. from silicon is located. This lens 22 serves to avoid total reflections within the terahertz converter 18, thereby improving the emission of terahertz radiation. At the same time, the lens 22 leads to a certain collimation of the exiting terahertz radiation.

The sleeve 13 is accommodated in an opening 23 in a housing 24 of the device 2. An arrow P indicates that in the present embodiment, the sleeve 13 is supported rotatably around the optical axis 19 within the opening 23. The rotational position of the terahertz converter 18 defines the polarization direction of the exiting terahertz radiation or of the received terahertz radiation, respectively. A rotation of the sleeve 13 in the direction of the arrow P (or in the opposite direction) leads to a variation of the rotational position of the terahertz converter 18 and, hence, to a variation of the polarization direction of the terahertz radiation. On the housing 24 or on the sleeve 13, a display means for indicating the rotational position of the sleeve 13 or of the terahertz converter 18 relative to the housing 24, respectively, may be provided.

In the device 2 according to the invention, the light guiding core of the wave guide fiber 4 has a diameter of about 10 μm. Since the frequency doubler 16 merely has a thickness of 100 to 300 μm, the beam of light is hardly widened by crossing the frequency converter 16. When the frequency doubled light arrives at the terahertz converter 18, the spot of light is hardly larger than about 20 μm, potentially even smaller. Even without any focusing or imaging optics, the present embodiment may achieve a comparatively small spot size on the terahertz converter 18, and therefore, a high efficiency of terahertz generation. The terahertz converter 18 itself is largely insensitive and transparent at the first wavelength $\lambda 1$. Thus, the non-frequency doubled portion of the laser radiation substantially passes through the terahertz converter 18 unhindered.

Figure 3:
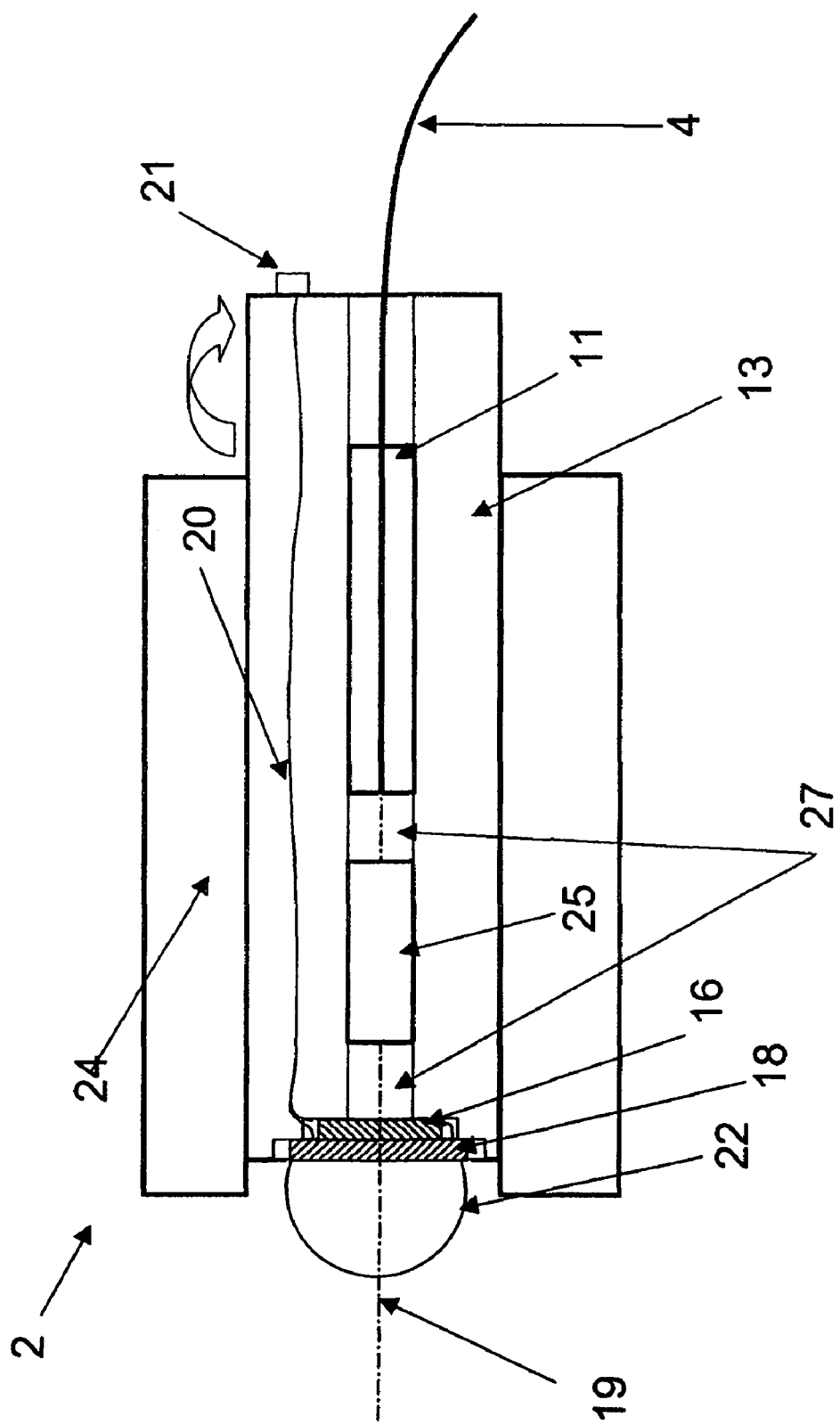
FIG. 3 is a second embodiment of a device according to the invention.

FIG. 3 shows a second embodiment of a device 2 according to the invention. This embodiment corresponds to the first embodiment, except for the following aspects.

In comparison to the first embodiment, the sleeve 13 has a larger length. In particular, however, the ferrule 11 with the end 10 of the wave guide fiber 4 is not in direct contact with the frequency converter 16 anymore, but located at a distance from the frequency converter 16. A focusing and imaging optics 25, i.e. a relay optics 25 is provided between the ferrule 11 and the frequency converter 16 in the bore 12 of the sleeve 13. In each of the spaces between the ferrule 11 and the focusing optics 25, as well as between the focusing optics 25 and the frequency converter 16, there is an air gap 27. The focusing optics 25 serve to concentrate the light exiting from the wave guide fiber 4 onto the frequency converter 16, or close to the end of the frequency converter 16 adjacent the terahertz converter 18.

Figure 4:
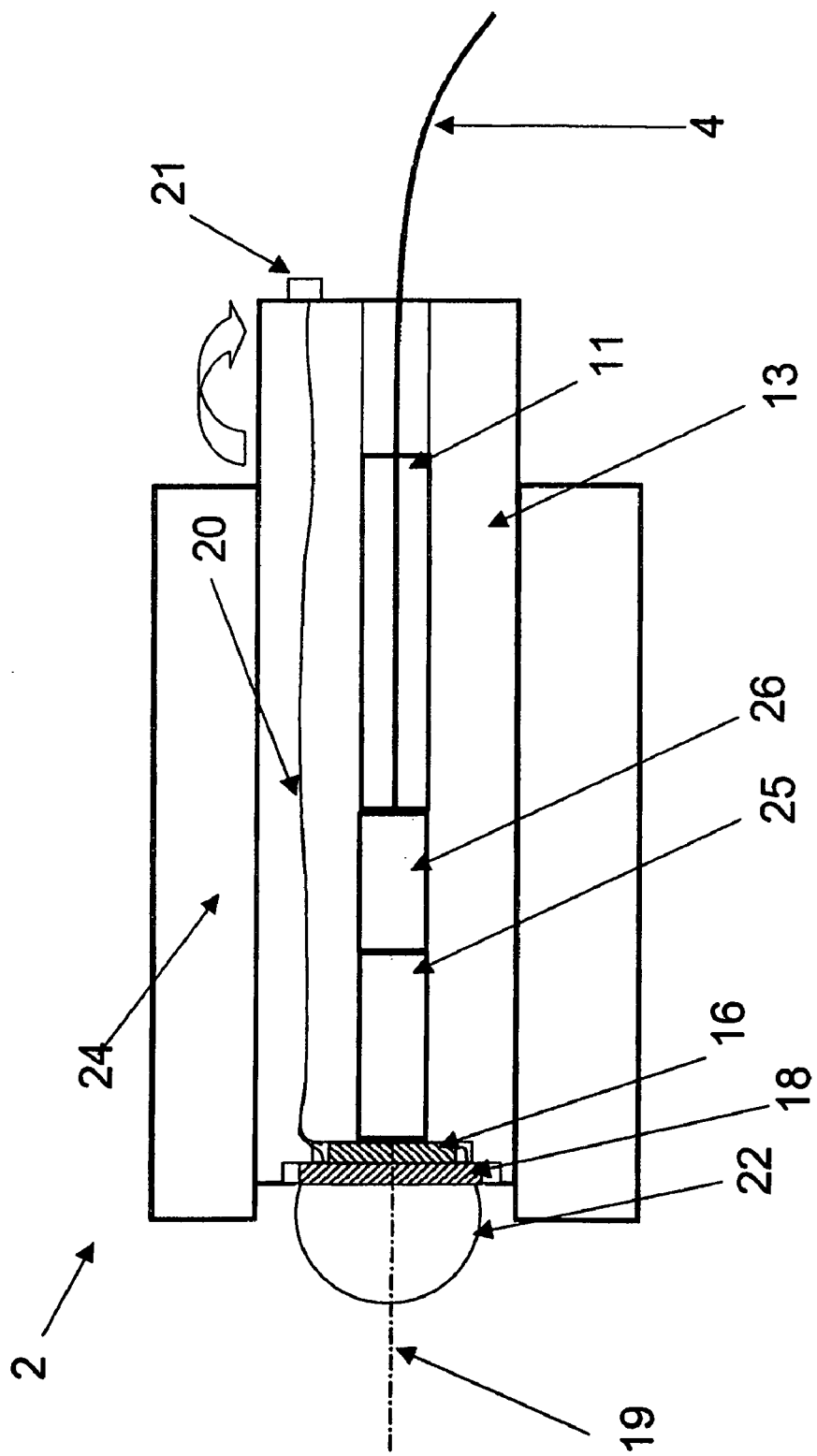
FIG. 4 shows a third embodiment of the present invention.

FIG. 4 shows a third embodiment of a device 2 according to the invention. It largely corresponds with the second embodiment. However, in the third embodiment of the device 2 there are no longer any air gaps in the bore 12. Rather, the focusing and imaging optics 25 is in direct contact with the frequency converter 16, and the space between the ferrule 11 and the focusing optics 25 is completely occupied by a transparent spacer piece 26, a so-called "spacer," which may be made e.g. from glass. The advantage of this third embodiment is that during assembly of the device 2, according to the invention, the focusing optics 25, the spacer piece 26 and the ferrule 11 may be pushed into direct contact with each other, such that they immediately adopt their predetermined distance and positively maintain this distance at any later time. Further, due to the distance maintained by the spacer piece 26, the light can be focused better (i.e. smaller), thereby increasing the efficiency of the frequency conversion.

Figure 5:
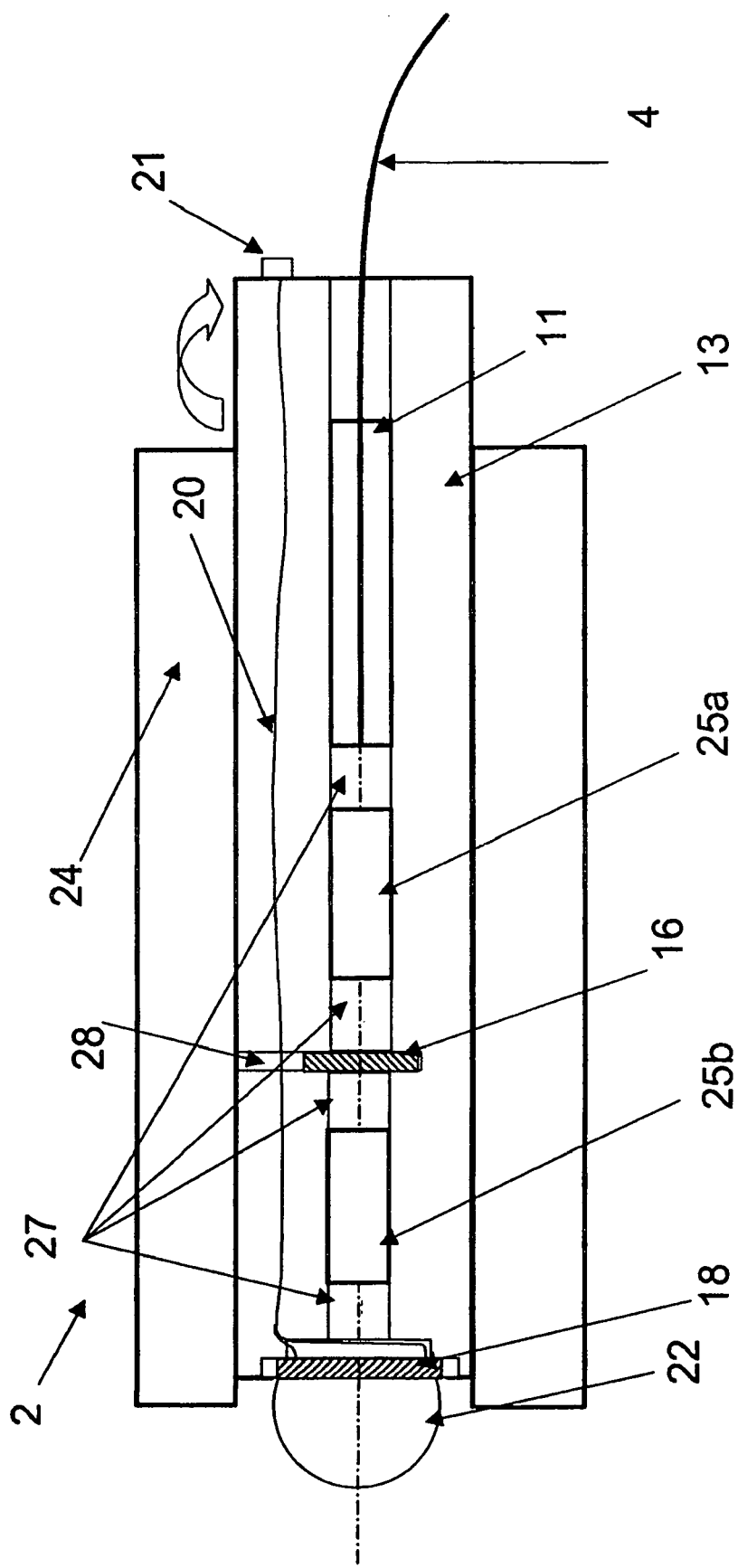
FIG. 5 shows a fourth embodiment of the present invention.

FIG. 5 shows a fourth embodiment of a device 2 according to the invention. In contrast to the preceding embodiments, the frequency converter 16 is here located at a distance from the terahertz converter 18. For example, the frequency converter 16 may be installed into a slit 28 provided for this purpose in the sleeve 13.

Between the ferrule 11 with the end 10 of the wave guide fiber 4 and the frequency converter 16, and also between the frequency converter 16 and the terahertz converter 18, a focusing or imaging optics 25 (i.e. a relay optics) is provided, respectively. The first relay optics 25a concentrates the light exiting from the wave guide fiber 4 onto the frequency converter 16. The second focusing optics 25b concentrates the light exiting from the frequency converter 16 onto the terahertz converter 18. While the first focusing optics 25a is optimized for a wavelength of $\lambda 1$, the second focusing optics 25b is optimized for the wavelength $\lambda 2$ of the frequency converted light. Each of the focusing optics 25a, 25b may comprises aspherical or gradient index lenses. Air gaps 27 are present in the sections between the ferrule 11 and the first focusing optics 25a, between the first focusing optics 25a and the frequency converter 16, between the frequency converter 16 and the second focusing optics 25b, and between the second focusing optics 25b and the terahertz converter 18.

Figure 6:
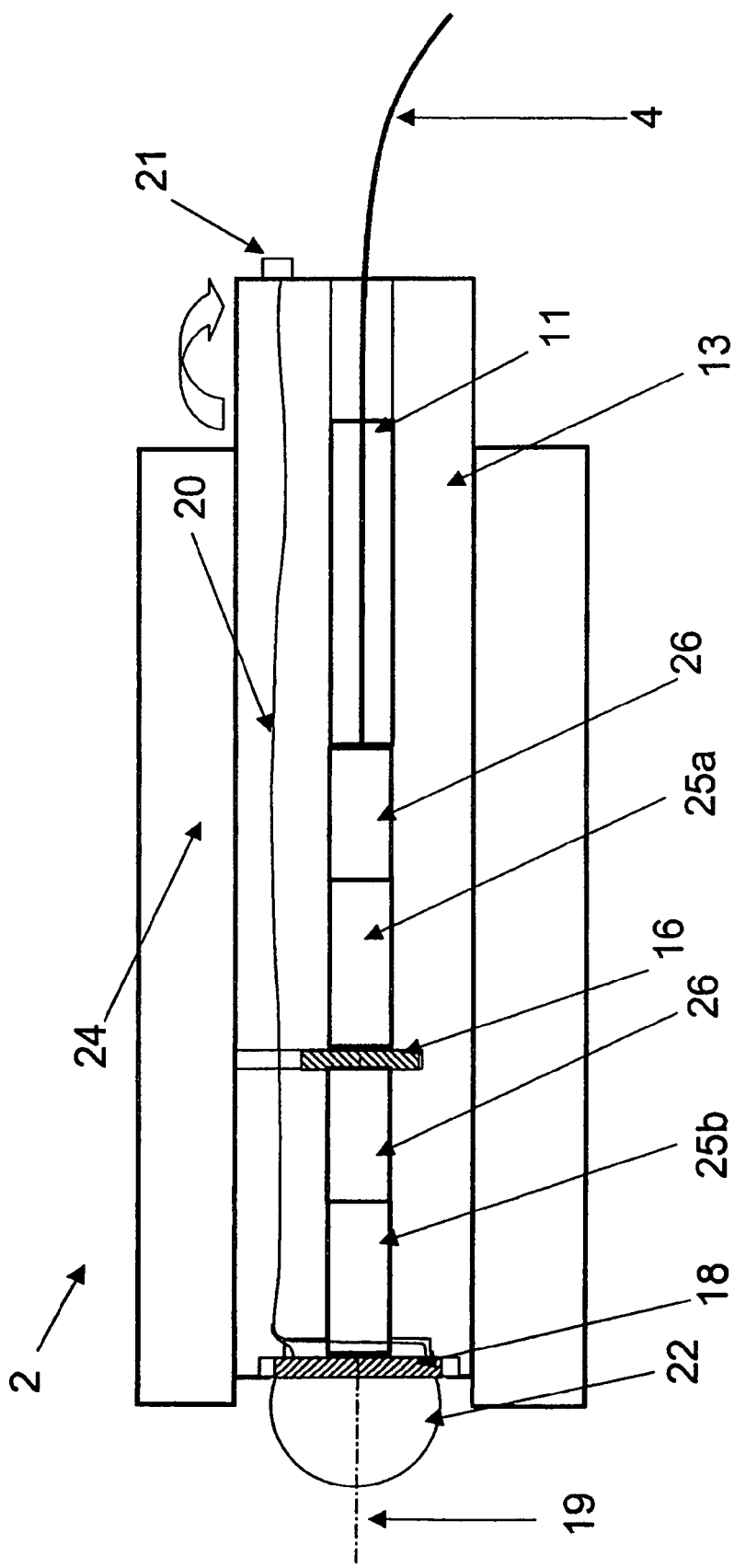
FIG. 6 shows a fifth embodiment of the present invention.

FIG. 6 shows a fifth embodiment of a device according to the present invention. It largely corresponds with the fourth embodiment—except for no air gaps 27 being present anymore in the bore 12 between the ferrule 1 and the terahertz converter 18. Rather, the focusing optics 25a, 25b are immediately adjacent the frequency converter 16 or the terahertz converter 18, respectively. The spaces between the ferrule 11 and the first focusing optics 25a as well as between the frequency converter 16 and the second focusing optics 25b, respectively, are bridged by transparent spacer pieces 26. In this regard, the fifth embodiment offers the same advantages as the third embodiment.

Figure 7:
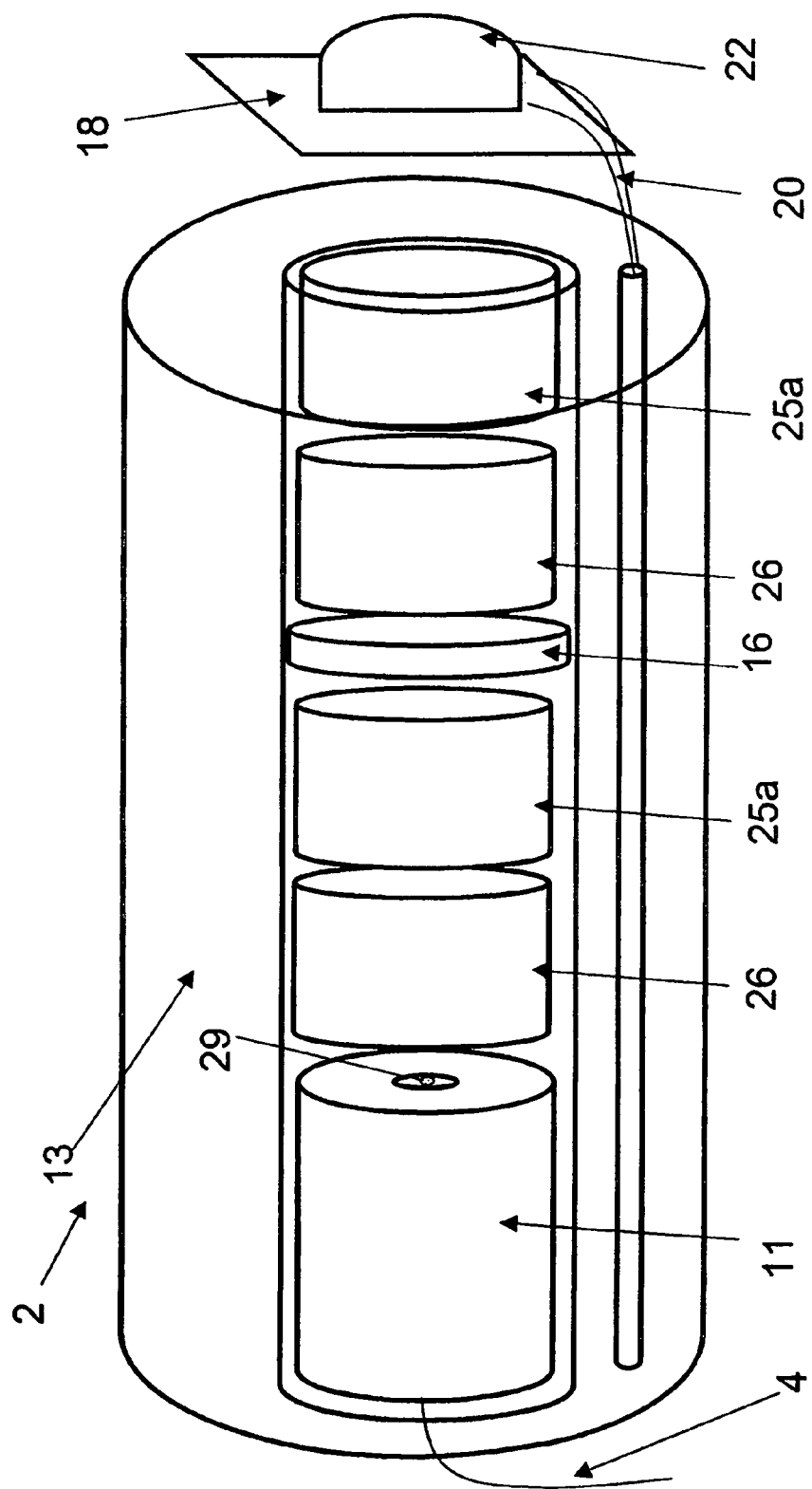
FIG. 7 is a perspective view of the embodiment shown in FIG. 6.

FIG. 7 shows the fifth embodiment of the device 2 according to the invention again in a perspective representation. In order to facilitate understanding, the optical elements within the bore 12 of the sleeve 13 are shown at a distance from each other.

The wave guide fiber 4 transporting the light of the first wavelength $\lambda 1$ leads into the device 2 on the left hand side. The end section of the wave guide fiber 4 is embedded into the ferrule 11. The light exiting from the core 29 of the wave guide fiber 4 passes a transparent spacer piece 26 and is focused by the first focusing optics 25a onto the frequency converter 16. Here, the frequency of the light is converted, such that a maximum portion of the light leaves the frequency converter 16 at a second wave length $\lambda 2$. This light (as well as the residual portion of light at the original wave length $\lambda 1$) passes another spacer piece 26. The light of the wavelength $\lambda 2$ is then focused by a second focusing optics 25b onto the terahertz converter 18. The terahertz radiation generated here leaves the device 2 of the invention via the terahertz lens 22.

Figure 8:
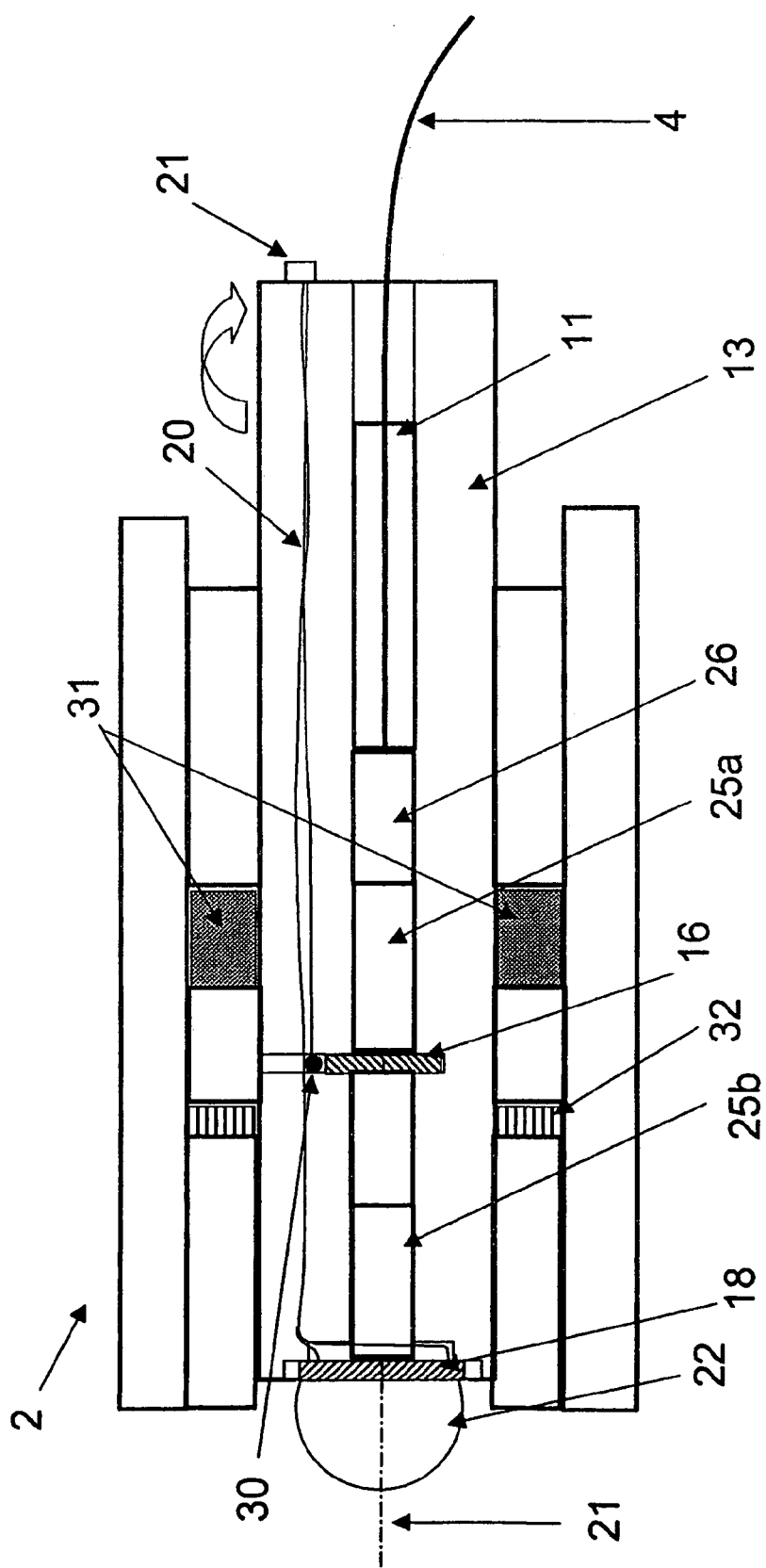
FIG. 8 shows a sixth embodiment of the present invention.

FIG. 8 shows a sixth embodiment of the device 2 of the present invention. This embodiment largely corresponds with the fifth embodiment, with the following differences. A temperature sensor 22 is arranged in the direct vicinity of the frequency converter 16, this temperature sensor 30 also being contacted by electrical conductors 20, and being arranged to detect and monitor the temperature of the frequency converter 16. A heating element 31, for example an electrical resistor element 31 arranged in an annular way around the frequency converter 16, is provided on the housing 24 in direct vicinity of the frequency converter 16. By the signal received from the temperature sensor 30, the heating element 31 may be controlled in such a way that the temperature of the frequency converter 16 is maintained as closely as possible to the point, at which the efficiency of the frequency conversion of the incoming lights of the wavelength λ1 is at its maximum. In the area between the frequency converter 16 and the terahertz converter 18, a thermal isolation 32 is provided on the housing 24. The purpose of this isolation 32 is to thermally isolate the terahertz converter 18 from the heating element 31, such that the temperature of the terahertz converter 18 may be held as constant as possible.

In each of the aforementioned embodiments of the invention, a possibility may be provided to rotate the sleeve 13 (including the wave guide fiber 4) relative to the terahertz converter 18, in order to adjust the efficiency of the terahertz converter 18. This may be particularly useful in combination with the use of polarized incoming laser light.

The THz wave emitted from the emitter antenna structure of the terahertz converter 18 has linear polarization. By rotating the terahertz converter 18, the direction of the polarization vector can be set and/or changed according to the needs. This is especially useful for the characterization of photonic crystals and meta materials in general which will play a major role in future photonics devices.

Also, polarization plays an important role in the destruction free testing and quality control, especially in conjunction with THz imaging. In Rutz et al., "Terahertz birefringence of liquid crystal polymers," APPLIED PHYSICS LETTERS 89, 221911, 2006, it is shown that the orientation of molecules in a polymer matrix can be detected. This might be used to detect strain and stress in polymer materials.

Vibrational circular dichroism (VCD) spectroscopy as discussed in E. Castro-Camus et al, "Polarisation-sensitive terahertz detection by multicontact photoconductive receivers", APPLIED PHYSICS LETTERS 86, 254102 (2005), in conjunction with polarization sensitive THz time domain spectroscopy should enhance the bandwidth and sensitivity of measurements, and allow dynamic time-resolved studies to be performed.

The invention claimed is:

1. A device for generating or receiving electromagnetic radiation in a frequency range from 10 GHz to 100 THz, comprising:
a housing;
a wave guide fiber leading into the housing, the wave guide fiber being adapted for guiding pulsed light having a first central wavelength;
a terahertz converter provided in the housing for generating or receiving the electromagnetic radiation in the frequency range from 10 GHz to 100 THz, the terahertz converter being rotatable relative to the housing around an optical axis of the light impinging on the terahertz converter; and
a frequency converter for converting the frequency of the light exiting from the wave guide fiber to a second central wavelength, the frequency converter being arranged in the housing between an end of the wave guide fiber and the terahertz converter in such a way that the terahertz converter is impinged upon by the frequency converted light.

2. The device according to claim 1, wherein the frequency converter is a frequency doubler.

3. The device according to claim 2, wherein the frequency doubler is configured to double the frequency of light from the first central wavelength of about 1,500 to 1,700 nm to light with the second central wavelength of about 750 to 850 nm.

4. The device according to claim 1, wherein the frequency converter is made from an optically nonlinear material.

5. The device according to claim 4, wherein the frequency converter is a BBO crystal or a PPLN crystal.

6. The device according to claim 1, wherein the frequency converter has a thickness of 50 μm to 1 mm in a direction parallel to a propagation direction of the light.

7. The device according to claim 4, wherein the frequency converter is an aperiodically poled crystal.

8. The device according to claim 1, wherein a temperature stabilization is provided for the frequency converter.

9. The device according to claim 1, wherein the frequency converter is located at a distance of less than 2 cm from the terahertz converter.

10. The device according to claim 1, wherein the frequency converter is located at a distance of less than 2 cm from the end of the wave guide fiber.

11. The device according to claim 1, wherein focusing or imaging optics are provided between the end of the wave guide fiber and the frequency converter and/or between the frequency converter and the terahertz converter.

12. The device according to claim 11, wherein the focusing or imaging optics comprise a gradient index lens.

13. The device according to claim 1, wherein the frequency converter is located directly adjacent the terahertz converter.

14. The device according to claim 1, wherein the frequency converter is located directly adjacent the end of the wave guide fiber.

15. The device according to claim 1, wherein between the end of the wave guide fiber and the terahertz converter, a distance between at least two adjacent optical elements is bridged by a transparent spacer piece, which is transparent for the respective central wavelength.

16. The device according to claim 1, wherein between the end of the wave guide fiber and the terahertz converter, spacer pieces transparent for the respective central wavelength are provided between all those neighboring optical elements which are not in direct contact with each other.

17. The device according to claim 1, wherein the end of the wave guide fiber is arranged in a ferrule.

18. The device according to claim 17, wherein the ferrule, the frequency converter and the terahertz converter are located in a sleeve accommodated in the housing.

19. The device according to claim 18, wherein the sleeve is a hollow cylinder.

20. The device according to claim 18, wherein the sleeve is rotatable around its longitudinal axis.

21. The device according to claim 20, wherein display means are provided for indicating the rotational position of the terahertz converter relative to the housing.

22. The device according to claim 21, wherein the display means indicates the rotational position of the terahertz converter relative to the housing.

23. The device according to claim 1, wherein the wave guide fiber is a polarization maintaining fiber.

24. The device according to claim 1, wherein the wave guide fiber is a zero dispersion fiber for light of the first central wavelength, or consists of at least two sections mutually compensating their dispersion for light of the first central wavelength.

25. The device according to claim 1, wherein a pulse duration of the pulsed light is between 10 fs and 10 ps.

26. The device according to claim 1, wherein a pulse duration of the terahertz radiation generated by the device is less than 10 ps.

27. A method for generating or receiving electromagnetic radiation in a frequency range from 10 GHz to 100 THz, the method comprising the following steps:
guiding pulsed light of a first central wavelength in a wave guide fiber to a frequency converter arranged in front of a terahertz converter;
converting the frequency of the light in the frequency converter to a second central wavelength; and
impinging the light of the second central wavelength onto the terahertz converter,
wherein the terahertz converter is configured for generating or receiving the electromagnetic radiation in the frequency range from 10 GHz to 100 THz in reaction to the impinging of the light of the second central wavelength, the terahertz converter is insensitive to the light of the first central wavelength or is transparent for the light of the first central wavelength, and the terahertz converter is rotated relative to the housing around an optical axis of the light impinging on the terahertz converter.

28. The method according to claim 27, further comprising the step of stabilizing the temperature of the frequency converter.

29. A device for generating or receiving electromagnetic radiation in a frequency range from 10 GHz to 100 THz, comprising:
a housing;
a sleeve including a wave guide fiber leading into the housing, the wave guide fiber being adapted for guiding pulsed light having a first central wavelength;
a terahertz converter provided in the housing for generating or receiving the electromagnetic radiation in the frequency range from 10 GHz to 100 THz; and
a frequency converter for converting the frequency of the light exiting from the wave guide fiber to a second central wavelength, the frequency converter being arranged in the housing between an end of the wave guide fiber and the terahertz converter in such a way that the terahertz converter is impinged upon by the frequency converted light,
wherein the sleeve is rotatable relative to the terahertz converter, in order to adjust the efficiency of the terahertz converter.

30. The device according to claim 29, wherein the frequency converter is a frequency doubler.

31. The device according to claim 30, wherein the frequency doubler is configured to double the frequency of light from the first central wavelength of about 1,500 to 1,700 nm to light with the second central wavelength of about 750 to 850 nm.

32. The device according to claim 29, wherein the frequency converter is made from an optically nonlinear material.

33. The device according to claim 32, wherein the frequency converter is a BBO crystal or a PPLN crystal.

34. The device according to claim 29, wherein the frequency converter has a thickness of 50 μm to 1 mm in a direction parallel to a propagation direction of the light.

35. The device according to claim 32, wherein the frequency converter is an aperiodically poled crystal.

36. The device according to claim 29, wherein a temperature stabilization is provided for the frequency converter.

37. The device according to claim 29, wherein the frequency converter is located at a distance of less than 2 cm from the terahertz converter.

38. The device according to claim 29, wherein the frequency converter is located at a distance of less than 2 cm from the end of the wave guide fiber.

39. The device according to claim 29, wherein focusing or imaging optics are provided between the end of the wave guide fiber and the frequency converter and/or between the frequency converter and the terahertz converter.

40. The device according to claim 39, wherein the focusing or imaging optics comprise a gradient index lens.

41. The device according to claim 29, wherein the frequency converter is located directly adjacent the terahertz converter.

42. The device according to claim 29, wherein the frequency converter is located directly adjacent the end of the wave guide fiber.

43. The device according to claim 29, wherein between the end of the wave guide fiber and the terahertz converter, a distance between at least two adjacent optical elements is bridged by a transparent spacer piece, which is transparent for the respective central wavelength.

44. The device according to claim 29, wherein between the end of the wave guide fiber and the terahertz converter, spacer pieces transparent for the respective central wavelength are provided between all neighboring optical elements which are not in direct contact with each other.

45. The device according to claim 29, wherein the terahertz converter is rotatable relative to the housing around an optical axis of the light impinging on the terahertz converter.

46. The device according to claim 29, wherein the end of the wave guide fiber is arranged in a ferrule.

47. The device according to claim 29, wherein display means are provided for indicating the rotational position of the sleeve.

48. The device according to claim 29, wherein the wave guide fiber is a polarization maintaining fiber.

49. The device according to claim 29, wherein the wave guide fiber is a zero dispersion fiber for light of the first central wavelength, or consists of at least two sections mutually compensating their dispersion for light of the first central wavelength.

50. The device according to claim 29, wherein a pulse duration of the pulsed light is between 10 fs and 10 ps.

51. The device according to claim 29, wherein a pulse duration of the terahertz radiation generated by the device is less than 10 ps.

* * * * *